(12) United States Patent
Liu

(10) Patent No.: US 9,195,270 B2
(45) Date of Patent: Nov. 24, 2015

(54) DISPLAY DEVICE FOR NOTEBOOK COMPUTER

(71) Applicant: WISTRON CORPORATION, New Taipei (TW)

(72) Inventor: Li-Wei Liu, New Taipei (TW)

(73) Assignee: Wistron Corporation, New Taipei (TW)

( * ) Notice: Subject to any disclaimer, the term of this patent is extended or adjusted under 35 U.S.C. 154(b) by 16 days.

(21) Appl. No.: 14/324,708

(22) Filed: Jul. 7, 2014

(65) Prior Publication Data
US 2014/0321042 A1    Oct. 30, 2014

Related U.S. Application Data

(63) Continuation-in-part of application No. 13/653,668, filed on Oct. 17, 2012, now Pat. No. 8,811,004.

(51) Int. Cl.
| | |
|---|---|
| H05K 5/00 | (2006.01) |
| H05K 7/00 | (2006.01) |
| G06F 1/16 | (2006.01) |
| F16B 1/00 | (2006.01) |
| F16B 2/22 | (2006.01) |
| F16B 5/06 | (2006.01) |
| F16B 21/08 | (2006.01) |

(52) U.S. Cl.
CPC ............... G06F 1/1637 (2013.01); F16B 1/00 (2013.01); F16B 2/22 (2013.01); F16B 5/065 (2013.01); F16B 21/086 (2013.01); G02F 2201/00 (2013.01)

(58) Field of Classification Search
CPC .... H05K 5/02; G02F 1/133308; G06F 1/1637
USPC .............. 361/679.01–679.03, 679.55–679.59
See application file for complete search history.

(56) References Cited

U.S. PATENT DOCUMENTS 6,151,207 A  *  11/2000  Kim ...................... G06F 1/1637
                                                         349/58
6,172,869 B1   1/2001  Hood, III et al.
(Continued)

FOREIGN PATENT DOCUMENTS

| TW | M295413 U | 8/2006 |
|---|---|---|
| TW | 201211960 A | 3/2012 |
| TW | M428371 U | 5/2012 |

OTHER PUBLICATIONS

Office Action dated Jun. 23, 2014 to Taiwanese Patent Application No. 101118765.

Primary Examiner — Jerry Wu
(74) Attorney, Agent, or Firm — The Mueller Law Office, P.C.

(57) ABSTRACT

A display device includes a cover having an inner surface, and a clamping unit provided on the inner surface and having two spaced-apart clamping arms. A display panel includes a protruding portion protruding from a frame thereof, corresponding in position to the clamping unit, and formed with a through hole. The bezel includes a through hole formed in a bezel body thereof and registered with the through hole in the protruding portion. The shock absorbing positioner includes a positioning post protruding from a pad body thereof. The positioning post extends through the through holes in the bezel body and the protruding portion, and is clamped between the clamping arms, thereby fixing together the bezel, the display panel and the cover.

6 Claims, 8 Drawing Sheets

(56) References Cited

U.S. PATENT DOCUMENTS

| | | |
|---|---|---|
| 6,636,282 B2 | 10/2003 | Ogawa et al. |
| 6,828,721 B2 | 12/2004 | Wakita |
| 7,187,540 B2 * | 3/2007 | Homer .................. G06F 1/1609 345/173 |
| 7,267,313 B2 | 9/2007 | Krzoska et al. |
| 7,304,837 B2 | 12/2007 | Lo et al. |
| 7,609,529 B2 | 10/2009 | Chiang et al. |
| 7,724,315 B2 * | 5/2010 | Ryu .................. G02F 1/133308 348/60 |
| 7,936,413 B2 | 5/2011 | Jeong et al. |
| 8,434,251 B2 * | 5/2013 | Lee .......................... H05K 5/02 292/80 |
| 8,493,722 B2 | 7/2013 | Chien et al. |
| 8,599,331 B2 | 12/2013 | Zhao |
| 2004/0141102 A1 | 7/2004 | Lin |
| 2005/0195560 A1 | 9/2005 | Kim et al. |
| 2008/0019084 A1 | 1/2008 | Lee et al. |

* cited by examiner

DISPLAY DEVICE FOR NOTEBOOK COMPUTER

CROSS REFERENCE TO RELATED APPLICATION

This application is a continuation-in-part of U.S. patent application Ser. No. 13/653,668, filed on Oct. 17, 2012, which claims priority of Taiwanese Patent Application No. 101118765, filed on May 25, 2012.

FIELD OF THE INVENTION

The invention relates to a display device, more particularly to a display device for a notebook computer.

DESCRIPTION OF THE RELATED ART

Referring to FIG. 1, a conventional display device 9 for a notebook computer is shown to include a cover 91, a bezel 92 connected to the cover 91, and a display panel 93 embedded within the bezel 92.

Generally, the cover 91 and the bezel 92 are assembled to each other by using a plurality of screws (not shown). To achieve light and thin display device 9, thin screws must be used and the number of the screws must be reduced. However, this results in a poor fixation effect. On the other hand, some manufacturers assemble the cover 91 and the bezel 92 using an adhesive. However, it is difficult to rework or repair the display device 9 using such method.

SUMMARY OF THE INVENTION

Therefore, an object of the present invention is to provide a display device for a notebook computer that dispenses with the use of screws.

According to the present invention, a display device for a notebook computer comprises a cover having an inner surface, a clamping unit, a display panel, a bezel and a shock absorbing positioner. The clamping unit is provided on the inner surface of the cover and includes two spaced-apart clamping arms. The display panel includes a panel module disposed on the inner surface of the cover, a frame surrounding fixedly a periphery of the panel module, a protruding portion protruding from the frame in a direction parallel to the inner surface of the cover and corresponding in position to the clamping unit, and a through hole formed in the protruding portion. The bezel includes a bezel body covering the display panel at a side distal from the cover, and a through hole formed in the bezel body and registered with the through hole in the protruding portion. The shock absorbing positioner includes a pad body abutting against a surface of the bezel body that is distal from the display panel, and a positioning post protruding from the pad body toward the bezel body. The positioning post extends through the through hole in the bezel body and the through hole in the protruding portion, and is clamped between the clamping arms, thereby fixing together the bezel, the display panel and the cover.

The beneficial effect of this invention resides in that by using the coordination of the clamping unit and the shock absorbing positioner, a screwless and stable positioning effect can be achieved, and shock absorbing and grounding effects are incorporated as well.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
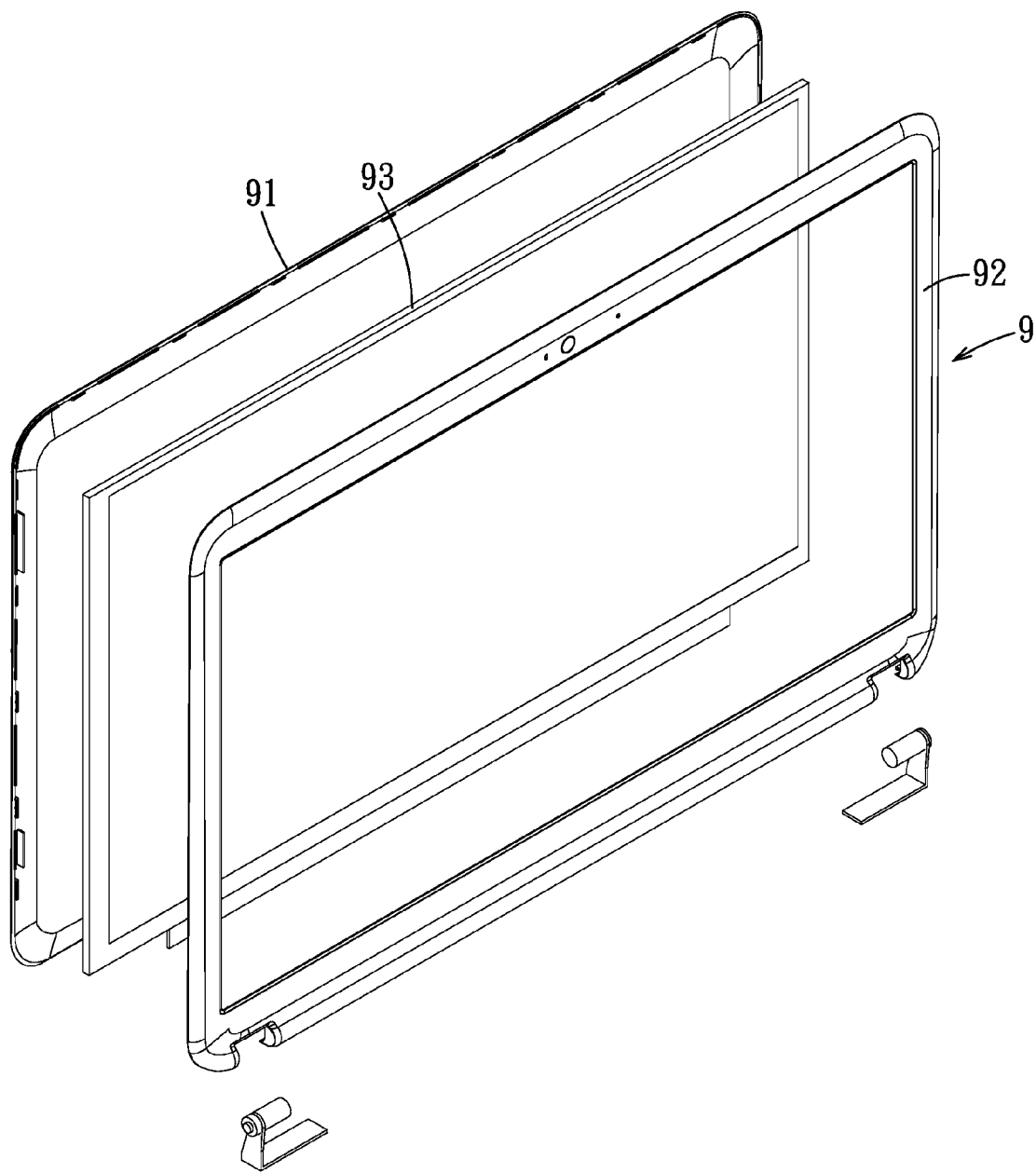
FIG. 1 is an exploded perspective view of a conventional display device for a notebook computer.

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Figure 2:
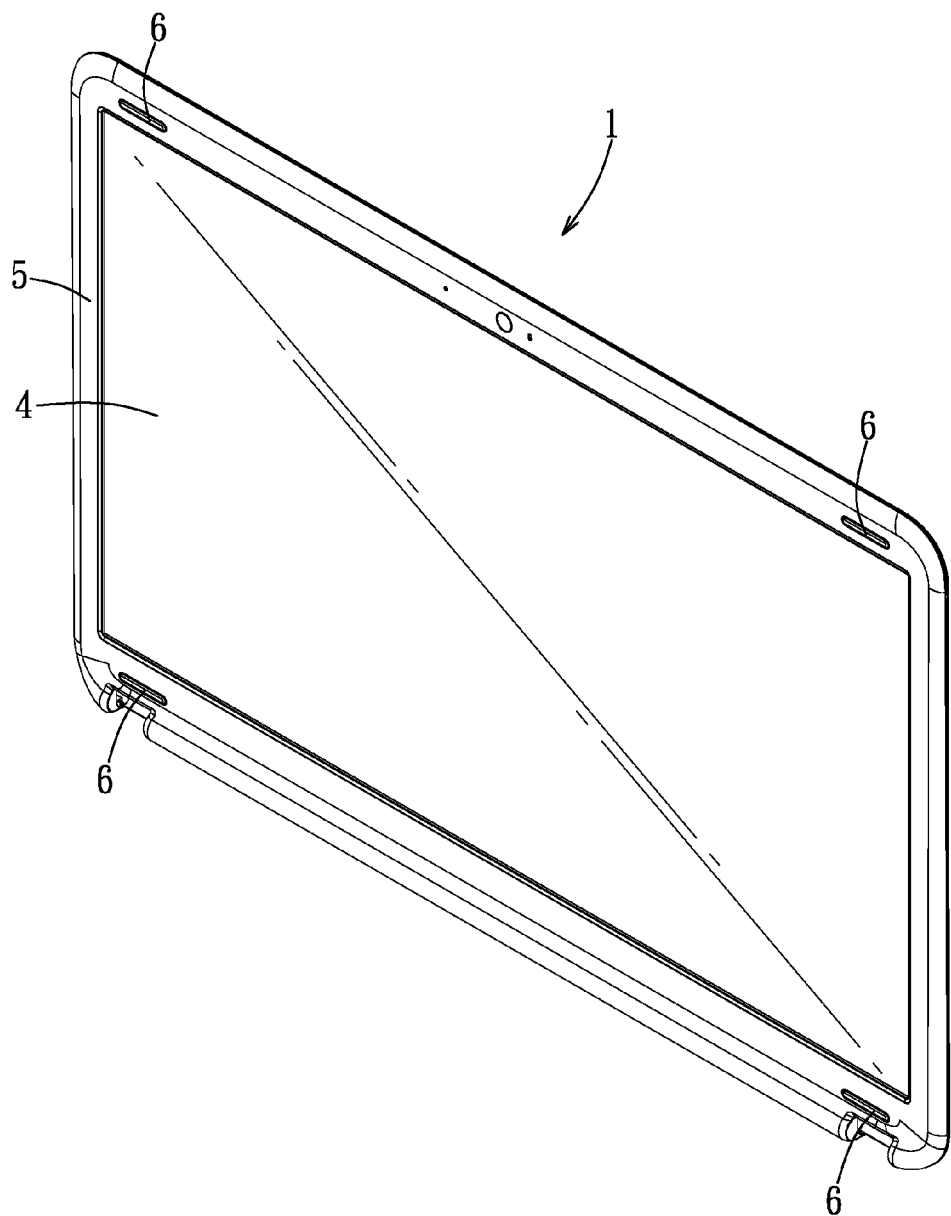
FIG. 2 is an assembled perspective view of a display device for a notebook computer according to the first embodiment of this invention.
Figure 3:
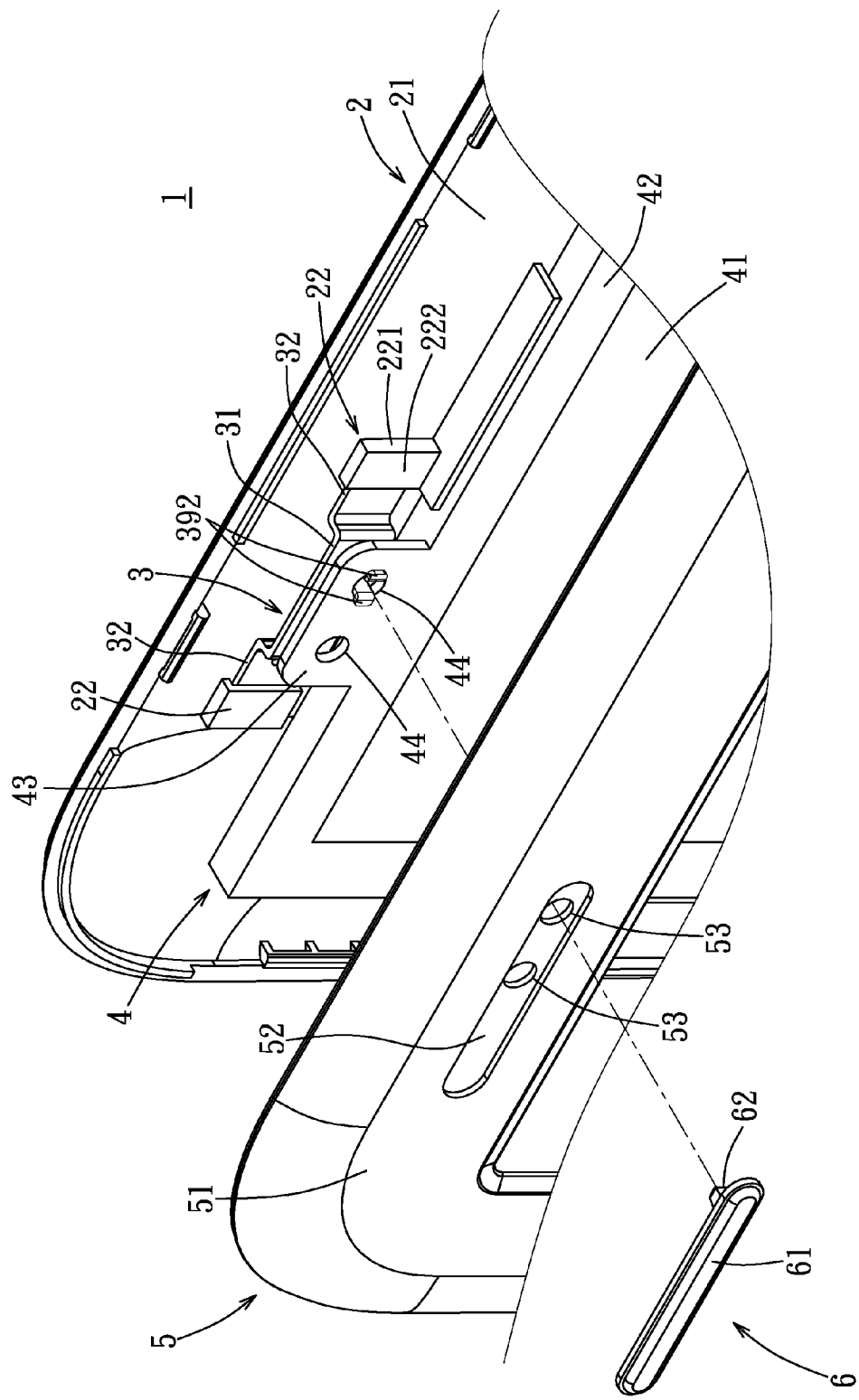
FIG. 3 is a fragmentary exploded perspective view of the first embodiment.
Figure 4:
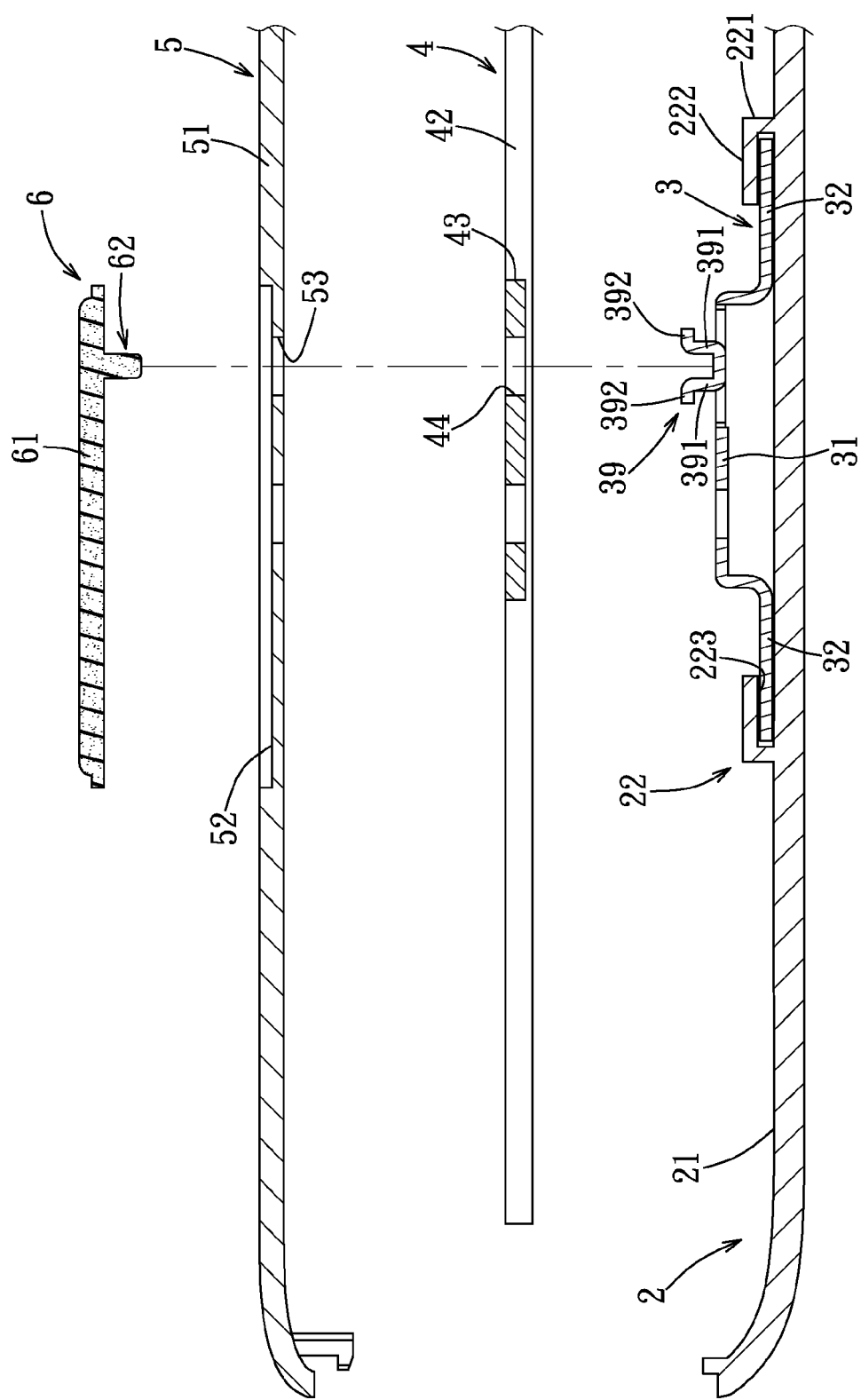
FIG. 4 is a fragmentary exploded sectional view of the first embodiment.

Referring to FIG. 2, a display device 1 for a notebook computer according to this invention is adapted to be mounted pivotably to a host of a notebook computer (not shown) to cover or uncover the same.

Referring to FIGS. 3 to 7, in combination with FIG. 2, the display device 1 according to the first embodiment of this invention comprises a cover 2, a clamping unit 39, a display panel 4, a bezel 5, and a shock absorbing positioner 6. In this embodiment, each corner of the display device 1 employs the structural cooperation of the cover 2, the clamping unit 39, the display panel 4, the bezel 5 and the shock absorbing positioner 6. Since the structural cooperation of the cover 2, the clamping unit 39, the display panel 4, the bezel 5 and the shock absorbing positioner 6 at each corner of the display device 1 is similar, only the structural cooperation of the cover 2, the clamping unit 39, the display panel 4, the bezel 5 and the shock absorbing positioner 6 at one of the corners of the display device 1 will be described hereinafter.

The cover 2 has two spaced-apart limiting bodies 22 and a resilient mounting plate 3. Each limiting body 22 includes a substantially U-shaped surrounding wall 221 connected transversely to an inner surface 21 of the cover 2, and a limiting wall 222 connected to the surrounding wall 221 and disposed oppositely of and parallel to the inner surface 21. The inner surface 21, the surrounding wall 221 and the limiting wall 222 cooperatively define a receiving space 223 having an opening. The openings of the receiving spaces 223 of the limiting bodies 22 face each other. The resilient mounting plate 3 is formed by punching a metal sheet into the required configuration, and provides shock absorbing and grounding effects. However, it is not limited as such. The resilient mounting plate 3 may be made from a resilient non-metallic material. In this case, the resilient mounting plate 3 is sputtered with metallic substances at least partially on a surface thereof to achieve a grounding effect.

The resilient mounting plate 3 includes a main plate portion 31 spaced apart from and parallel to the inner surface 21, and two arms 32. The arms 32 respectively extend from two opposite lateral ends of the main plate portion 31 toward the cover 2, and are then bent arcuately in opposite directions to respectively insert into the receiving spaces 223 of the limiting bodies 22 via the openings thereof to fix the resilient mounting plate 3 to the inner surface 21 of the cover 2. Each arm 32 is configured as a bent plate.

Figure 6:
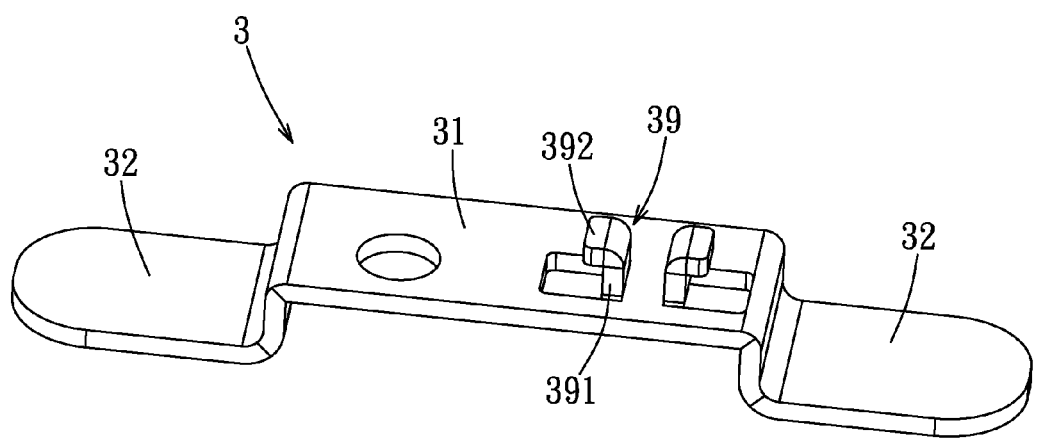
FIG. 6 is a perspective view of a resilient mounting plate of the first embodiment.
Figure 7:
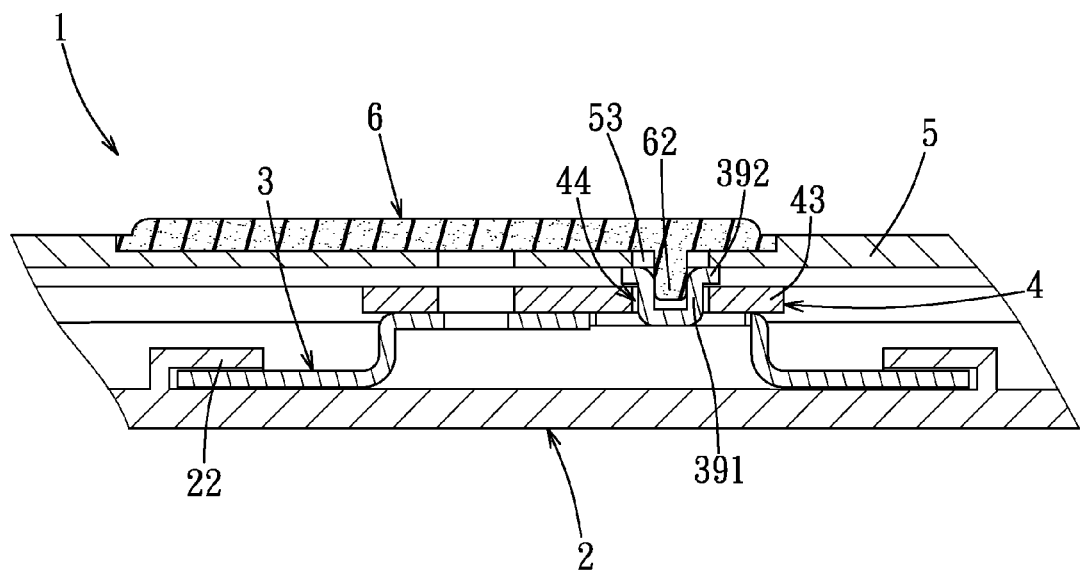
FIG. 7 is a fragmentary sectional view of the first embodiment in an assembled state.

The clamping unit 39, as shown in FIG. 6, includes two spaced-apart clamping arms 391 extending transversely from the main plate portion 31 in a direction away from the inner surface 21 of the cover 2. Each of the clamping arms 391 has an engaging hook 392 at one end thereof that is distal from the main plate portion 31. The engaging hooks 392 of the clamping arms 391 extend oppositely away from each other.

The display panel 4 includes a panel module 41 disposed on the inner surface 21 of the cover 2, a frame 42 made of metal and fixedly surrounding a periphery of the panel module 41, a protruding portion 43 protruding integrally from the frame 42 in a direction parallel to the inner surface 21 of the cover 2 and corresponding in position to the resilient mounting plate 3, and at least one through hole 44 formed in the protruding portion 43 and corresponding in position with the clamping unit 39. Alternatively, the frame 42 and the protruding portion 43 may be made of a non-metal material. In this case, the frame 42 and the protruding portion 43 may be sputtered with metallic substances on surfaces thereof, and then cooperate with the resilient mounting plate 3 for achieving the grounding effect.

The bezel 5 includes a bezel body 51 covering the display panel 4 at a side that is distal from the cover 2, an elongated shallow groove 52 formed in a surface of the bezel body 51 that is distal from the display panel 4, and at least one through hole 53 formed in a groove wall that defines the shallow groove 52. The through hole 53 is registered with the through hole 44, and corresponds in position with the clamping unit 39.

Figure 5:
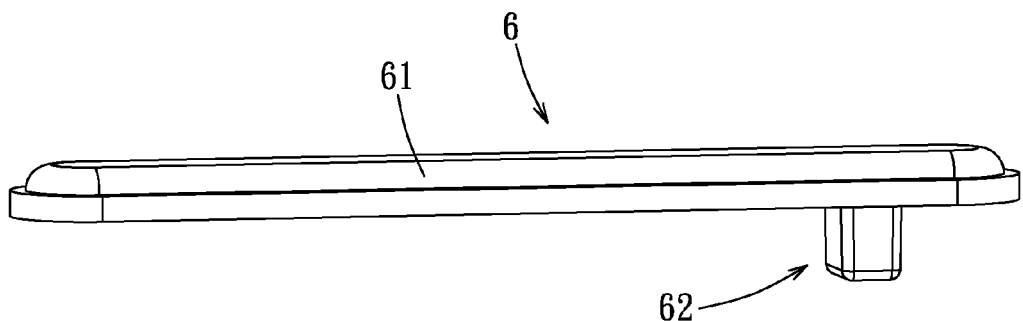
FIG. 5 is a perspective view of a shock absorbing positioner of the first embodiment.

The shock absorbing positioner 6 is made of rubber and, as shown in FIG. 5, includes an elongated pad body 61, and a positioning post 62 protruding from one side of the pad body 61. Concretely speaking, the pad body 61 has a contour conforming to that of the shallow groove 52 so as to be received therein, and protrudes partially out of the shallow groove 52 after assembly. The positioning post 62 has a rectangular shape. The number of the positioning post 62 may be increased as required, and is not limited to the aforesaid disclosure.

During assembly, the display panel 4 is first mounted on the cover 2 by inserting the clamping arms 391 through the through hole 44 with the engaging hooks 392 extending out of the through hole 44. As such, the protruding portion 43 is retained between the engaging hooks 392 of the clamping arms 391 and the main plate portion 31, and cannot be easily removed therefrom. Next, the bezel 5 is brought close to the display panel 4 with the through hole 53 aligning with the clamping arms 391, and the positioning post 62 of the shock absorbing positioner 6 is inserted through the through hole 53 and the through hole 44, and is clamped between the clamping arms 391. Through this, removal of the bezel 5 and the display panel 4 from the cover 2 can be prevented. The positioning post 62 is rectangular so that it will not rotate relative to the clamping arms 391.

Through the coordination of the clamping arms 391 of the clamping unit 39 and the shock absorbing positioner 6 and other coordinating structures, assembly of the display device 1 does not need the use of screws, and the display device 1 can achieve a stable positioning effect and a good shock absorbing effect.

Figure 8:
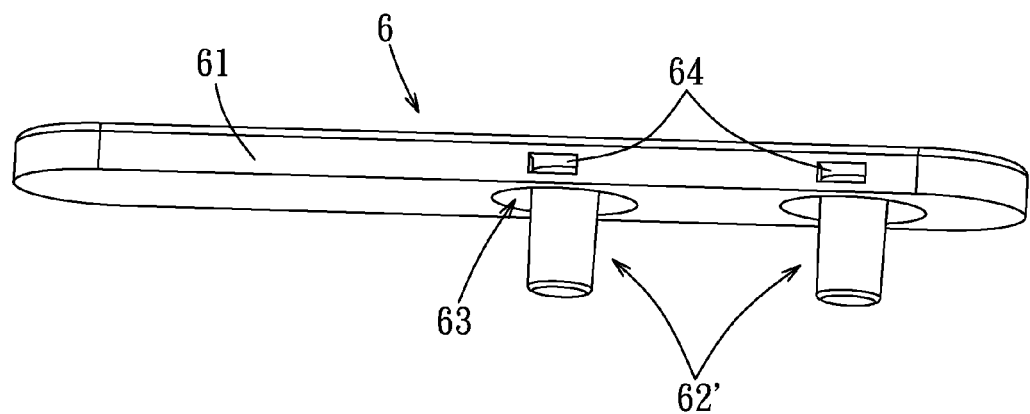
FIG. 8 is a perspective view of a shock absorbing positioner of a display device for a notebook computer according to the second embodiment of this invention.
Figure 9:
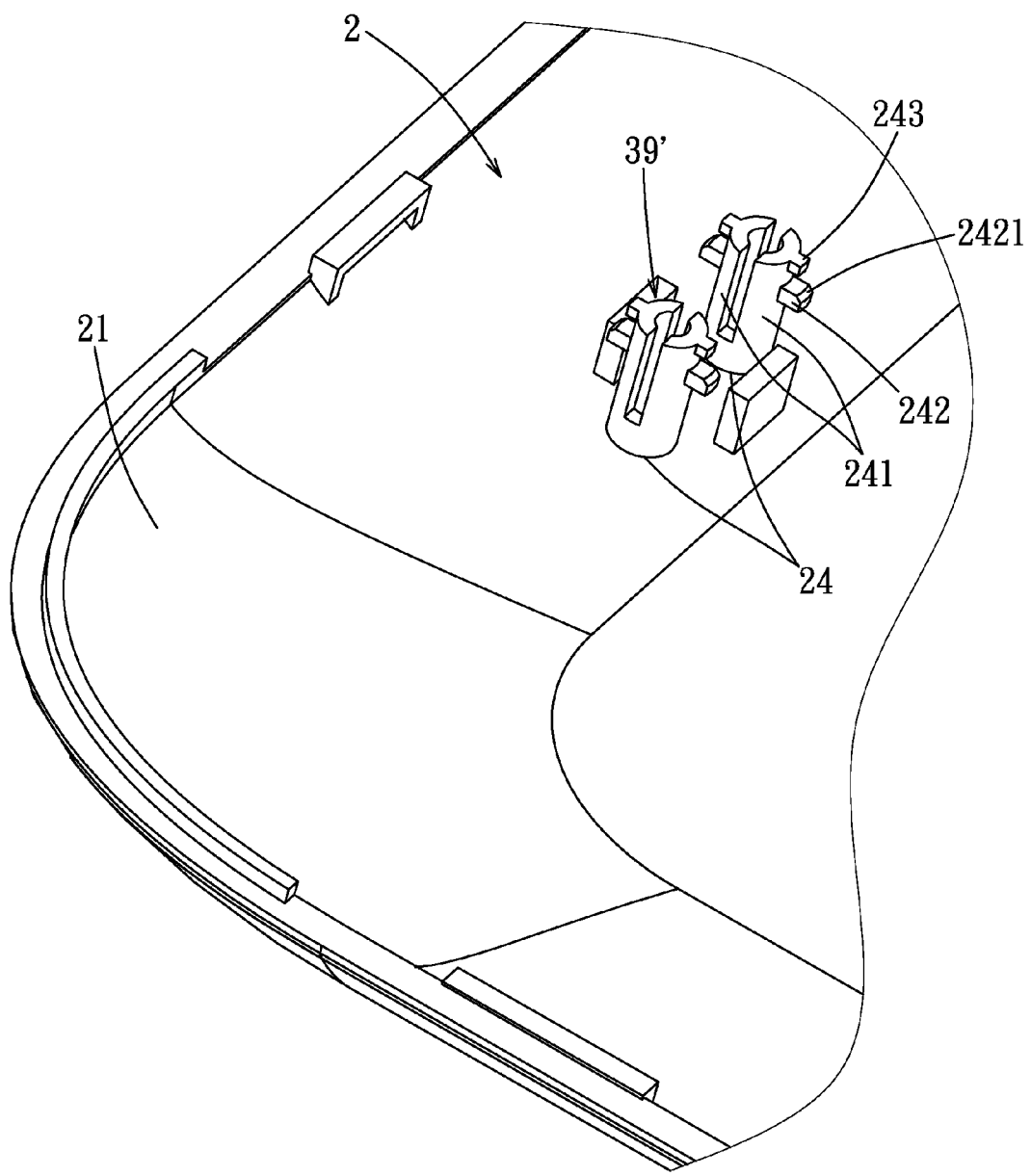
FIG. 9 is a fragmentary enlarged perspective view of a cover of the second embodiment.
Figure 10:
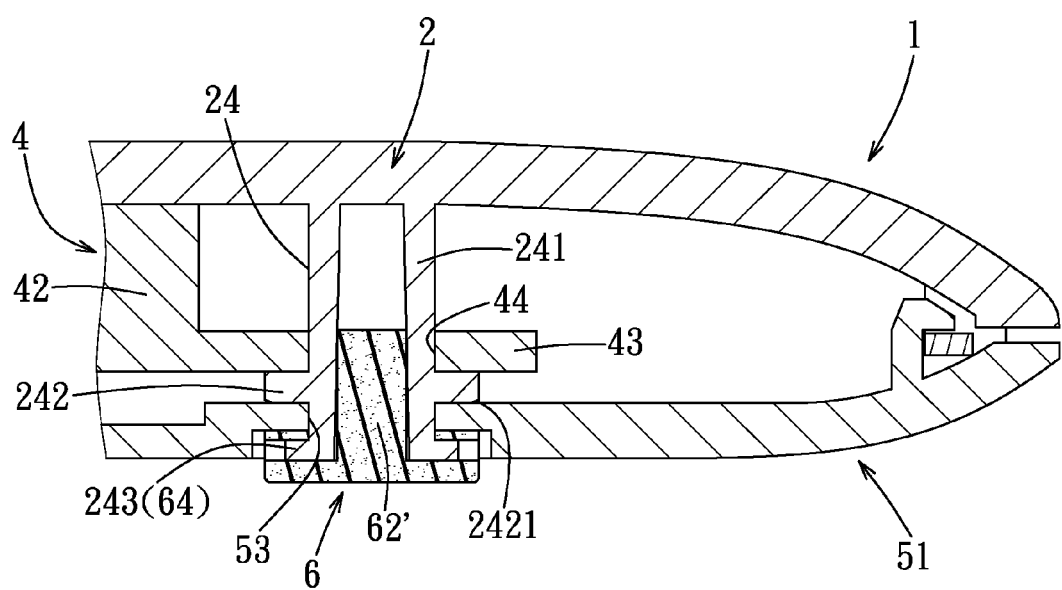
FIG. 10 is a fragmentary sectional view of the second embodiment in an assembled state.

Referring to FIGS. 8 to 10, the second embodiment of the display device 1 according to this invention is shown to be similar to the first embodiment. However, in this embodiment, the structures of the shock absorbing positioner 6 and the cover 2 are slightly modified.

In this embodiment, the shock absorbing positioner 6 includes two positioning posts 62', and the pad body 61 is formed with two spaced-apart cavities 63 at one side thereof that faces the bezel body 51. Each of the cavities 63 has a diameter larger than that of each positioning post 62'. Each positioning post 62' is formed in and protrudes out of a respective cavity 63. The shock absorbing positioner 6 further includes two pairs of engaging holes 64, each pair of which are formed in a periphery of the pad body 61 in communication with and on two opposite sides of a corresponding cavity 63. In this embodiment, each positioning post 62' is cylindrical. Preferably, each positioning post 62' is tapered to facilitate assembly.

Further, in this embodiment, the display panel 4 has two spaced-apart through holes 44 (see FIG. 3), and the bezel 5 has two spaced-apart through holes 53 (see FIG. 3) registered with the respective through holes 44.

The clamping unit 39' in this embodiment includes two spaced-apart tubular bases 24 projecting from the inner surface 21 of the cover 2 and corresponding in position with the positioning posts 62'. The clamping arms 241 are formed as tubular halves that project axially from a corresponding tubular base 24. The clamping unit 39' further includes two first engaging hooks 242 projecting radially and outwardly from outer surfaces of the respective clamping arms 241, and two second engaging hooks 243 projecting radially and outwardly from edges of the respective clamping arms 241 distal from the inner surface 21. The first engaging hooks 242 are respectively spaced apart from and substantially parallel to the second engaging hooks 243. Each first engaging hook 242 is provided with a guiding corner 2421 formed at an edge thereof which is proximate to the respective second engaging hook 243. Through this, extension of the first engaging hooks 242 through a corresponding through hole 44 in the protruding portion 43 during assembly can be facilitated.

During assembly, with reference to FIG. 10, the display panel 4 is first mounted on the cover 2 by extending the second engaging hooks 243 through the corresponding through hole 44 in the protruding portion 43, followed by the extension of the first engaging hooks 242 through the through hole 44. As such, the first engaging hooks 242 are retained between protruding portion 43 and the bezel body 51, and the protruding portion 43 is limited between the first engaging hooks 242 and the cover 2, so that the protruding portion 43 cannot be easily removed therefrom. Next, the bezel 5 is mounted on the cover 2 by extending the second engaging hooks 243 through the corresponding through hole 53 in the bezel body 51, so that the bezel 5 is limited by the second engaging hooks 243, and cannot be easily removed therefrom. Finally, the positioning post 62' is inserted between the clamping arms 241, so that the positioning post 62' is clamped between the clamping arms 241. Through this, removal of the bezel 5 and the display panel 4 from the cover 2 can be prevented.

It is worth to mention that when the assembly of the shock absorbing positioner 6 is completed, the edges of the clamping arms 241 extend into the corresponding cavity 63, and the second engaging hooks 243 extend into a respective pair of the engaging holes 64, so that the entire assembly is firm.

In sum, the display device 1 for a notebook computer according to this invention uses the coordination of the cover 2 and the shock absorbing positioner 6 to achieve a screwless and stable positioning effect and to incorporate shock absorbing and grounding effects as well. Hence, the object of this invention is served.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display device for a notebook computer, comprising:
   a cover having an inner surface;
   a clamping unit provided on said inner surface of said cover and including two spaced-apart clamping arms;
   a display panel including a panel module disposed on said inner surface of said cover, a frame surrounding fixedly a periphery of said panel module, a protruding portion protruding from said frame in a direction parallel to said inner surface of said cover and corresponding in position to said clamping unit, and a through hole formed in said protruding portion;
   a bezel including a bezel body covering said display panel at a side distal from said cover, and a through hole formed in said bezel body and registered with said through hole in said protruding portion; and
   a shock absorbing positioner including a pad body abutting against a surface of said bezel body that is distal from said display panel, and a positioning post protruding from said pad body toward said bezel body, said positioning post extending through said through hole in said bezel body and said through hole in said protruding portion and being clamped between said clamping arms, thereby fixing together said bezel, said display panel and said cover.

2. The display device as claimed in claim 1, wherein said cover further has a resilient mounting plate that includes a main plate portion spaced apart from and parallel to said inner surface of said cover, and two arms respectively extending from two opposite lateral ends of said main plate portion and fixed to said inner surface of said cover, said clamping arms extending transversely from said main plate portion in a direction away from said inner surface of said cover.

3. The display device as claimed in claim 2, wherein each of said clamping arms has an engaging hook at one end thereof that is distal from said main plate portion, said engaging hooks of said clamping arms extending oppositely away from each other, said positioning post having a rectangular shape.

4. The display device as claimed in claim 2, wherein said cover further has two spaced-apart limiting bodies corresponding in position to said resilient mounting plate, each of said limiting bodies including a surrounding wall connected transversely to said inner surface of said cover, and a limiting wall connected to said surrounding wall and disposed oppositely of and parallel to said inner surface of said cover, said surrounding wall, said limiting wall and said inner surface of said cover cooperatively defining a receiving space having an opening, said openings of said receiving spaces of said limiting bodies facing each other, said arms of said resilient mounting plate being bent arcuately in opposite directions after respectively extending from said two opposite lateral ends of said main plate portion and being inserted respectively into said receiving spaces via said openings.

5. The display device as claimed in claim 1, wherein said clamping unit further includes a tubular base projecting from said inner surface of said cover and corresponding in position to said positioning post, said clamping arms being formed as tubular halves that project axially from said tubular base, said clamping unit further including two first engaging hooks projecting radially and outwardly from outer surfaces of the respective said clamping arms, and two second engaging hooks projecting radially and outwardly from edges of the respective said clamping arms distal from said inner surface of said cover and substantially parallel to said first engaging hooks.

6. The display device as claimed in claim 5, wherein:
   said pad body is formed with a cavity at one side thereof that faces said bezel body, said cavity having a diameter larger than that of said positioning post, said positioning post being formed in and protruding out of said cavity, said shock absorbing positioner further including a pair of engaging holes formed in a periphery of said pad body in communication with and on two opposite sides of said cavity, and
   when said shock absorbing positioner is assembled on said cover, said clamping arms extend through said through hole in said protruding portion and said through hole in said bezel body into said cavity of said pad body, said second engaging hooks respectively engaging said engaging holes in said pad body, said first engaging hooks being retained between said protruding portion and said bezel body.

* * * * *